May 28, 1963 M. E. PRATHER 3,091,682
HEATING UNIT WITH COLLAPSIBLE TERMINALS
Original Filed March 31, 1960 2 Sheets-Sheet 1
FIG.1
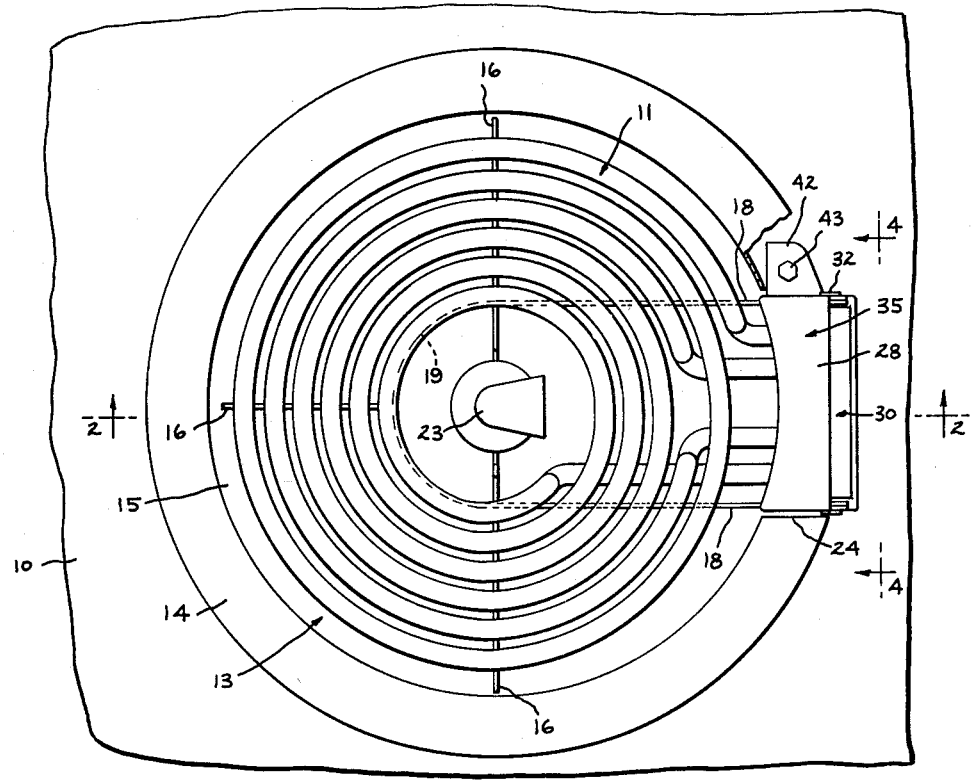
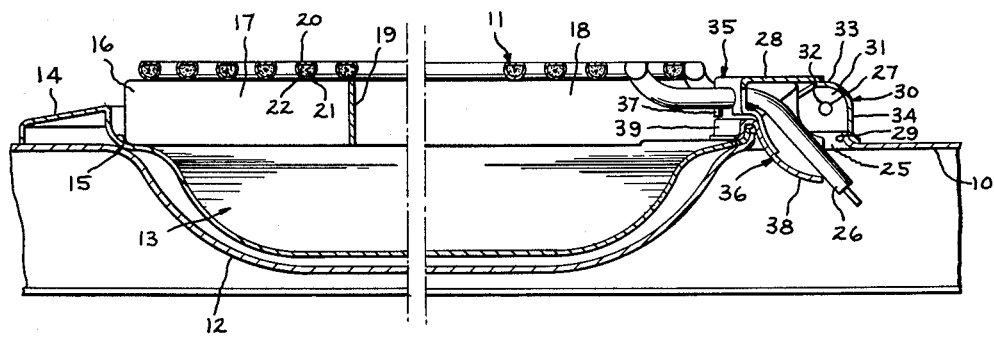
FIG.2
*INVENTOR.*
MARVIN E. PRATHER
*Richard L. Caslin*
HIS ATTORNEY

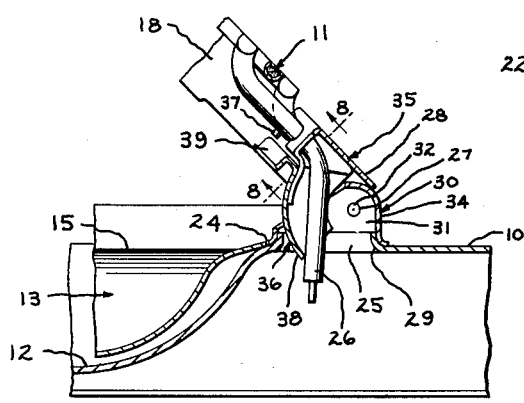
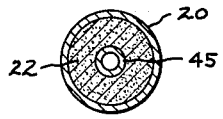
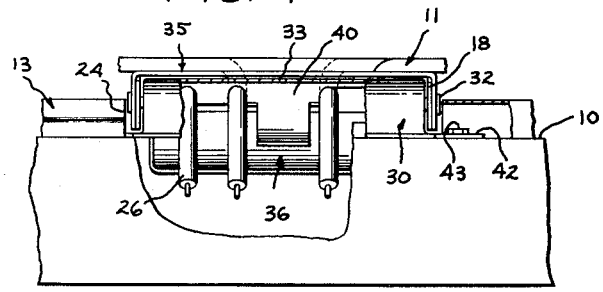
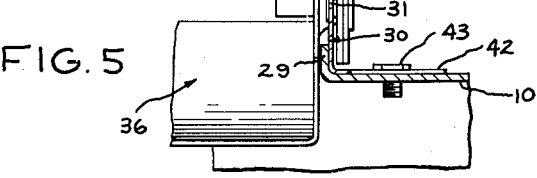
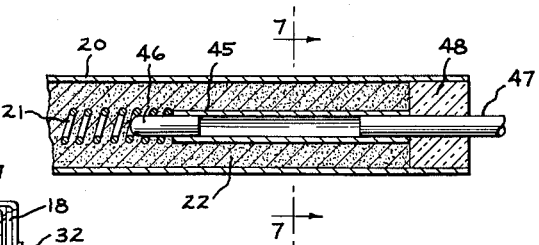
INVENTOR.
MARVIN E. PRATHER __# United States Patent Office__

3,091,682
Patented May 28, 1963

3,091,682
HEATING UNIT WITH COLLAPSIBLE
TERMINALS
Marvin E. Prather, Louisville, Ky., assignor to General
Electric Company, a corporation of New York
Original application Mar. 31, 1960, Ser. No. 19,006, now
Patent No. 3,051,818, dated Aug. 28, 1962. Divided
and this application Apr. 17, 1961, Ser. No. 103,587
4 Claims. (Cl. 219—37)

The present invention relates generally to an electric range where each heating element is positioned over an imperforate concavity in the cooking surface, and hinge means is provided over a hole in the cooking surface adjacent the concavity for receiving the terminal ends of the heating element therethrough and preventing spillage of liquid through the hole. Specifically this invention deals with a novel terminal construction for a metal sheathed heating element to faciltate the ease of bending the terminals around a sharp radius. This application is a division of my copending parent application Serial No. 19,006, now Patent No. 3,051,818, entitled, "Electric Range With Spill-Proof Cooking Surface," which was filed on March 31, 1960.

A standard electric range is provided with a top cooking surface having a series of four large holes therethrough. Each hole receives an annular reflector pan having a large central hole therein. An electric heating element is supported across the top surface of the reflector pan. Hinge means is also provided for each heating element so that the element may be pivoted to a raised position and the reflector pan removed for cleaning. A metal drip box as well underlying the cooking surface must be scrubbed clean. One advantage of the large holes in the cooking surface for receiving the heating elements is that only a small amount of the heat is lost from the heating elements to the cooking surface. One main disadvantage is that food and especially liquids will spill into the reflector pan and out the bottom thereof into the metal drip box supported under the heating elements. It is a laborious job to keep this box clean since it is difficult to reach all areas of the box through the openings, and the visibility is poor.

The principal object of the present invention is to provide a metal sheathed heating element with a novel terminal construction of a collapsible nature to faciltate the ease of bending the terminals around a sharp radius without damaging the insulating properties of the element. Such a terminal construction has general utility in this art but it is especially adapted for use with a range having a spill-proof cooking surface.

A further object of the present invention is to provide a novel cold terminal for a metal sheathed heating element to enable a more severe flattening of the terminals without harming its insulating properties to allow sharper bends and higher section strength in the plane of the longest axes of the flattened terminal.

The present invention is shown, for purposes of illustration only, as being embodied in an electric range having a top cooking surface with at least one imperforate concavity and preferably three or four although its utility is not limited to such a use. An imperforate reflector pan is positioned in the cavity and is suspended by outwardly extending flanges bearing on the cooking surface. The heating unit includes a heating element in the form of spiral loops, which element is fastened on a supporting framework suspended across the top of the reflector pan. The reflector pan serves to reflect the heat from the heating element away from the cooking surface. A hole is formed in the cooking surface adjacent the concavity for receiving the terminal ends of the heating element therethrough. A hinge means is formed over the hole and above the cooking surface for pivotal engagement with the supporting framework of the heating element to allow the heating unit to be raised so the reflector pan may be removed and the concavity cleaned, when necessary. The hinge means includes a covering overlying the hole in the cooking surface to prevent liquids from spilling therein. Moreover, the edge of the hole is turned up slightly above the top of the cooking surface so that on boil-overs the liquid will not fill the pan and flood into the hole receiving the terminals, but instead will run onto the cooking surface where it may be cleaned easily.

With the above explanation taken from my parent application as background material, the novelty of the present invention should be understood as dealing with the terminal ends of the metal sheathed heating element which are provided with an inner collapsible tube. This tube is connected with the resistance heating wire and yields to collapse under pressure, thereby to render the terminals easy to bend where they extend from the spiral loops of the surface units and through the hole in the cooking surface. This invention in providing the collapsible tubes prevents reduction in thickness of the insulation between the tube and the outer metal sheath when the terminal ends are bent sharply across the tubes, the tubes yielding under the pressure of the insulation as the heater is bent.

My invention will be better understood from the following description taken in connection with the accompanying drawings and its scope will be pointed out in the appended claims.

FIGURES 1–5 are mostly background information for understanding the utility of the present invention.

FIGURE 1 is a top plan view of a portion of the cooking surface of an electric range showing only one of the surface heating units embodying the present invention.

FIGURE 2 is a cross-sectional elevational view taken through the center of the heating element and its hinge means on the line 2—2 of FIGURE 1.

FIGURE 3 is a fragmentary elevational view similar to that of FIGURE 2 showing the hinged side of the heating element when it is in a raised position.

FIGURE 4 is an elevational view partly broken away taken on the lines 4—4 of FIGURE 1 showing the interior of the covering of the hinge means.

FIGURE 5 is an enlarged fragmentary view of the right side of the hinge means of FIGURE 4 showing the manner of pivotally connecting the various elements together.

FIGURES 6–8 are the best showings of the present invention.

FIGURE 6 is a longitudinal cross-sectional view of one of the terminal ends of the heating element showing the use of a collapsible inner tube connected to one end of the helical resistance heater wire.

FIGURE 7 is a transverse cross-sectional view of the heating element terminal taken on the line 7—7 of FIGURE 6 through the collapsible tube.

FIGURE 8 is a transverse cross-sectional view similar to that of FIGURE 7 but taken after the terminal has being flattened by collapsing the tube and the terminal bent as at line 8—8 of FIGURE 3.

Turning now to a consideration of the drawings and in particular to FIGURES 1 and 2, 10 represents a portion of the top cooking surface of an electric range, while 11 is one of the metal sheathed heating elements provided on the cooking surface. A standard range usually includes four such heating units of various sizes and wattages, but the present invention will be explained by describing only one of them since the same invention would ordinarily be used on all of the surface heating elements. In FIGURE 2 there is shown a circular concavity 12 which is pressed down into the top cooking surface to form a "bird bath." This concavity is imperforate. A metal reflector pan 13 is positioned within the concavity 12 and provided with a horizontally disposed side flange 14 for supporting the weight of the pan from the top cooking surface 12 so that the bottom of the pan will be raised above and out of contact with the bottom wall of the concavity 12. This is to reduce the conduction of heat from the reflector pan into the cooking surface whereby the cooking surface will run as cool as possible and prolong the life of the porcelain enamel finish of the cooking surface.

The top edge of the pan 13 is also provided with a circular ledge 15 just inside the flange 14. The bottom of the ledge also rests upon the top cooking surface 10. The purpose of this ledge is to serve as the support for the arms 16 of a framework structure 17 that underlies the heating element 11 and is fastened thereto. This framework 17 comprises two parallel arms 18 that extend from one side of the heating element generally toward the center thereof where they are joined together by a semi-circular piece 19. Three radially extending arms 16 extend from the semi-circular portion 19 as is best seen in the plan view of FIGURE 1. The heating element has one or more spirally wound loops, each formed by an outer sheath member 20 that encloses a helically wound resistance wire 21 and is insulated from the wire by a powdered insulation 22 such as magnesium oxide that is tightly compacted into the sheath as is best shown in FIGURE 6. A medallion 23 is fastened in the center of the heating element 11 to the framework 17 to reduce the size of the central opening within the loops as well as to show the brand name of the manufacturer.

As seen in FIGURE 2, a hole 25 of generally rectangular shape in plan view is punched into the cooking surface 10 adjacent the concavity 12 for receiving the terminal ends 26 of the heating element 11 therethrough. It is important to be able to raise the heating element for removing the reflector pan 13 so that it may be cleaned in the kitchen sink. Accordingly, a hinge means 27 is provided over the hole 25 for pivotally mounting the heating element 11 to the top of the cooking surface 10. Cooperating with the hinge means 27 is a covering 28 which is disposed around the terminals 26 and over the hole 25 in the cooking surface to prevent liquid from spilling through the hole 25 and onto the insulation (not shown) of the oven liner that underlies the cooking surface 10. The flange 14 of the pan is notched out at 24 to accommodate the hinge means 27 at one side of the heating unit as is seen in FIGURE 1.

In order to prevent liquids from overflowing the reflector pan and flooding into the hole 25 in the cooking surface, the edge 29 of the hole is turned upwardly to form a collar extending completely around the hole. The top surface of the collar rises above the cooking surface so that if the reflector pan 13 were to overflow through the notched portion 24 the liquid would flow onto the cooking surface 10 rather than into the hole 25. A hinge bracket 30 of generally rectangular shape in plan view is closely fitted over the raised edge 29 of the hole 25 in more or less mating engagement so that the hinge bracket has surfaces representing a detachable extension of the raised edge 29. On the opposite sides of the hinge plate 30 are a pair of upwardly projecting ears 31 each of which contain an opening for receiving a hinge pin 32 therein. Moreover, the hinge bracket 30 has a top wall 33 connecting the ears 31. The top wall is curved down into a back wall 34 to close the back of the hinge as best seen in FIGURE 2.

Fastened over the terminal ends 26 of the heating element is a covering 28 formed by a top cover 35 and a bottom cover 36 which encompass not only the terminals 26, but are attached to the parallel supporting arms 18 of the heating element framework. The top cover 35 has finger portions 37 disposed between the heating element terminals to close all large openings in the covering 28. The bottom cover 36 has an arcuately shaped and downwardly projecting front wall 38 which is closely spaced from the front side of the turned-up edge 29 of the hole in all positions of the heating element as is clearly seen in FIGURES 2 and 3. The bottom cover 36 also has a downwardly extending lip or shield 39 which overlies the raised edge 29 of the hole 25 and the mating front edge of the hinge bracket 30 to deflect any liquid that may spill on the cover. Looking at FIGURE 4 the top cover 35 has a downwardly and backwardly extending tongue 40 at the center which overlies the inner side of the arcuately shaped front wall 38 of the bottom cover 36 and is welded or otherwise fastened thereto as is seen in FIGURE 2. Moreover, the bottom plate is welded to the top cover 35 along the side edges of the two members so that the covering 28 is held rigidly to the framework arms 18 and the terminals 26 of the heating element.

Looking at the detailed view of FIGURE 5 of one side of the hinge, the top cover 35 is shown on the outside. Next there is the arm 18 of the supporting framework 17 for the heating element. Then there is the hinge plate 30 and, of course, the hinge pin 32 extending through all these members. The hinge plate 30 has oppositely directed horizontally disposed fastening tabs 42, each with an opening for receiving a screw 43 so that the heating unit may be fastened to the top of the cooking surface 10.

Much attention has been given above to the description of the structure centered around the hinge means 27 of the heating element. To summarize this structure it is not necessary that the covering 28 be water-proof and completely immersible without leaking such as is the requirement in small electric appliances, but it is important to make the design so that the cooking surface will be splash-proof and flood-proof from overflowing of the reflector pan. This has been accomplished by providing a top cover 35 and a bottom cover 36 fastened over the terminal ends of the heating element and overlying the hole 25. The detailed explanation given above relates mainly to the claimed invention of my parent application Serial No. 19,006.

Turning to a consideration of the present invention of the terminal end of the metal sheathed heating element shown in FIGURE 6, the helically wound resistance heater wire or coil 21 is centered in the outer sheath 20 by a compacted mass of powdered insulation 22 such as magnesium oxide. In the past an elongated cold terminal pin has been inserted into the end of the heater wire 21 and welded thereto. Such cold terminal pin would extend through a ceramic plug or seal in the end of the metal sheath 20 and a tab terminal (not shown) would be welded to the free end of the pin. Such a terminal pin has been of relatively heavy cross-section as compared with the heater wire so as to have low electrical resistance and operate cooler than the portion of the heating element which contains the resistance coil 21. Unfortunately when a sharp bend has been placed in the terminal end of the sheath, the powdered insulation 22 would tend to thin out at the top and bottom of the terminal pin and shift over to the sides thereby causing a weakness in the insulating properties and possible premature failure.

The present invention of the terminal end of the sheath is important in the hinged design disclosed above although it also has general utility in this art and may be used to advantage whenever it is important to be able to flatten the sheathed unit for sharp bends or added strength. The insulation is prevented from shifting by providing a collapsible metal tube 45 in the area of the bend. Each end of the tube may be provided with a pin 46 and 47, respectively. Pin 46 is welded within the end of the helical heater wire 21 as well as being fixed within the tube 45, while the other pin 47 has one end fixed within the tube and its central portion extends through a ceramic plug or seal 48 and out beyond the end of the unit so that a tab terminal may be welded thereto. The plug serves as a seal and a means of preventing the powdered insulation from escaping during fabrication and use. A transverse cross-section of the heating element terminal as shown in FIGURE 7 is taken on the line 7—7 of FIGURE 6. If the terminal end is first flattened and then bent sharply, the inner tube 45 will collapse and appear as shown in FIGURE 8 with important results that contribute to the success of the overall invention, such results particularly residing in the maintenance of the thickness of the insulating layers around the terminal, as shown in the FIGURE 8.

Having described above an important contribution to the art of making metal sheathed heating elements it will readily be understood by those skilled in this art that other means may be chosen for connecting the collapsible tube 45 with the end of the resistance wire 21. For example, the end of the wire could be inserted into the tube and the tube swaged or crimped over the wire. Another alternative would be to swage the end of the tube into a smaller diameter so that it may be inserted into the end of the helically wound heater wire. Moreover, the outer pin 47 could be eliminated and the tube 45 extended out through the ceramic plug or seal 48.

Modifications of this invention will occur to those skilled in the art and it is to be understood, therefore, that this invention is not limited to the particular embodiments disclosed but that it is intended to cover all modifications which are within the true spirit and scope of this invention as claimed.

What I claim as new and desire to secure by Letters Patent of the United States is:

1. An elongated sheathed heating unit comprising a bendable metal sheath, a resistance conductor housed within said sheath, powdered heat refractory electrically insulating material within said sheath tightly compacted around said conductor to form a layer separating it from said sheath, a collapsible tubular terminal element of conductive material connected with at least one end of said conductor and embedded in said insulating material so as to be separated from said sheath by a layer thereof, and means for sealing the insulation therein, said tubular element yielding so as to collapse under the pressure of such insulating material when said sheath is bent across a section extending through said tubular element thereby to obviate a reduction in the thickness of said layer of insulating material at said bent section between the metal sheath and the tubular terminal element.

2. A metal sheathed heating element comprising an inner resistance coil embedded in a mass of powdered insulating material, an outer metallic sheath housing said insulating material, the terminal ends of the heating element being bent at sharp angles, an elongated collapsible metal tube joined to the coil adjacent the terminal ends of the heating element and insulated from the outer sheath by such insulating material, the tube collapsing when the sheath of the terminal end is compressed by bending so as to avoid displacement of the insulation.

3. A metal sheathed heating element comprising an inner resistance coil embedded in a mass of electrical insulating material, and an outer metal sheath covering the insulation, the terminal ends of the heating element being compressible to facilitate the ease of bending the terminals about sharp curves, the compressible terminal ends including a collapsible tube which extends therethrough and is connected to the resistance coil at one end outside the area of the compressible terminal portion.

4. A metal sheathed heating unit as recited in claim 3 wherein a pin is fastened in each end of the tube, means fastening one pin to the related end of the resistance coil, while the other pin extends outwardly from the end of the sheath and serves as a terminal pin, and a sealing means positioned around the latter pin for retaining the insulating material within the sheath.

References Cited in the file of this patent
UNITED STATES PATENTS

| | | |
|---|---|---|
| 1,209,096 | Williamson | Dec. 19, 1916 |
| 2,094,480 | Vogel | Sept. 28, 1937 |
| 2,483,839 | Oakley et al. | Oct. 4, 1949 |
| 2,701,410 | Huck et al. | Feb. 8, 1955 |
| 3,061,808 | Wiegand | Oct. 30, 1962 |